Jan. 20, 1925.

A. E. NORRIS 1,523,829

WINCH

Filed March 31, 1921  3 Sheets-Sheet 1

Inventor:
Almon E. Norris,
by Emery, Booth, Janney and Varney
Attys.

Jan. 20, 1925.

A. E. NORRIS 1,523,829

WINCH

Filed March 31, 1921  3 Sheets-Sheet 2

Inventor:
Almon E. Norris,

Jan. 20, 1925.

A. E. NORRIS 1,523,829

WINCH

Filed March 31, 1921 3 Sheets-Sheet 3

Inventor:
Almon E. Norris.
by Emery, Booth, Janney and Varney
Attys.

Patented Jan. 20, 1925.

1,523,829

UNITED STATES PATENT OFFICE.

ALMON E. NORRIS, OF BROOKLINE, MASSACHUSETTS.

WINCH.

Application filed March 31, 1921. Serial No. 457,271.

*To all whom it may concern:*

Be it known that I, ALMON E. NORRIS, a citizen of the United States, and a resident of Brookline, in the county of Norfolk and State of Massachusetts, have invented an Improvement in Winches, of which the following description, in connection with the accompanying drawings, is a specification, like characters on the drawings representing like parts.

This invention relates to winches, and is more especially concerned with improvements relating to the driving mechanism, a brake to prevent reverse rotation, means to house and protect the brake and to prevent tampering therewith, means to ensure ample lubrication of the brake, and means to facilitate the dismounting of the mechanism as well as the reversal of the position of the driving member.

The invention will be best understood by reference to the following description, when taken in connection with the accompanying drawings of one illustrative embodiment thereof, while its scope will be more particularly pointed out in the appended claims.

Figure 1:
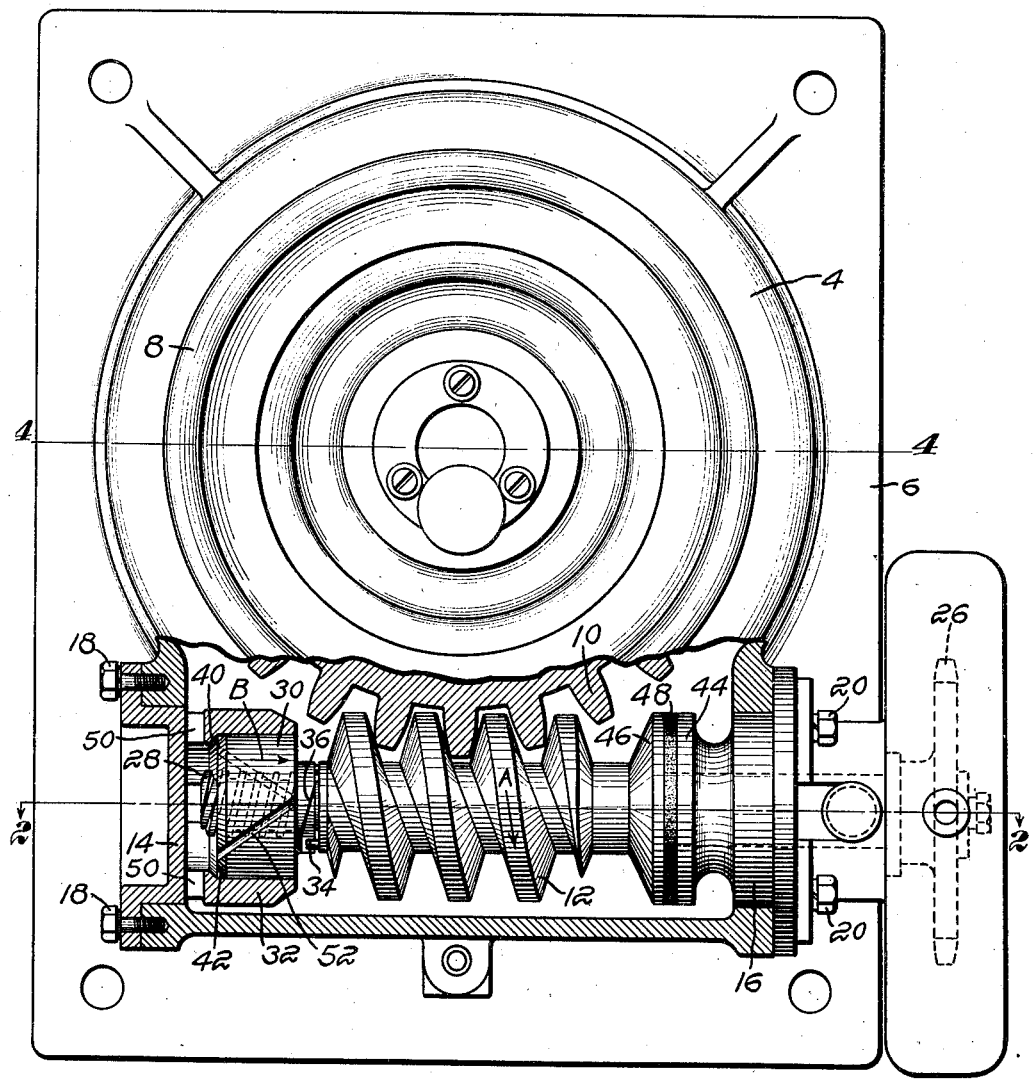
Fig. 1 is a plan, partly in horizontal section, of a winch exemplifying my invention.

Referring to the drawings, and to the embodiment of my invention which is selected for exemplification, I have shown a winch comprising a casing 4 presenting a base 6 surmounted by a winch-head 8 to which is secured a gear 10 driven by a worm 12, both housed within the casing. The worm in the present example is supported by interchangeable plugs 14 and 16, secured to the casing by cap screws 18 and 20, the arrangement being such that the drive for the worm may be at either end. In this embodiment, the worm is formed on a worm-shaft 22, mounted in a suitable bearing 24 and driven by appropriate means, herein a sprocket wheel 26 at the outer end of the shaft.

In the case of a cast worm gear, it is impracticable to use fine pitch teeth; but on the other hand, where a coarse pitch is employed, the likelihood of the worm being driven by the load in the reverse direction, when the application of power is discontinued, is great. I have, therefore, provided an automatic brake mechanism, which is released when the worm is driven by power in one direction, and is applied when the application of power is discontinued, and if there is any tendency of the worm to be rotated in the reverse direction under the influence of the worm gear.

In the illustrative embodiment herein shown, the brake mechanism comprises a screw 28 and nut 30, one carried by the worm and the other mounted to turn and slide axially in a surrounding sleeve 32, conveniently formed as an integral part of the plug 14. The screw and nut present a convenient support and bearing for the adjacent end of the worm. It should here be noted that the lead of the screw is opposite to that of the worm. It follows that when the worm is driven in the direction of the arrow A, the nut will travel in the direction of the arrow B. On the other hand, if the application of power should be discontinued, and the worm gear tends to drive the worm in a reverse direction, the nut will travel in the opposite direction. This follows because of the fact that the frictional resistance presented by the engagement of the external surface of the nut with the surrounding sleeve is greater than that presented by the internal surface of the nut and the enclosed screw.

Although the inclination of the screw is preferably rather steep, as shown, still it is desirable to provide means to prevent the nut from becoming jammed endwise against the worm. To this end, there is provided a clearance space between the confronting end surfaces of the worm and nut, while the latter is in its extreme right-hand position as viewed in Fig. 2. A minimum clearance space is predetermined by limiting the relative rotation of the worm and nut in the direction which causes one to approach the other, as by the provision of cooperating stops, herein two pins 34 carried by the worm and adapted to engage holders 38 presented by the nut. Accordingly, there is no danger of the nut becoming jammed and locked against the worm. As the ends of the pins travel in helical paths corresponding to the thread of the screw, the end of the nut in the present example is formed with corresponding helical surfaces 36, which, however, need not necessarily engage the ends of the pins. When using an engine as the source of power to drive the winch, the engine gives a slight backward kick after it is shut off. The limited relative rotation of the worm and nut under these circumstances permits slight reverse rotation of the worm under the influence of the engine, before the application of the brake by the load.

Figure 2:
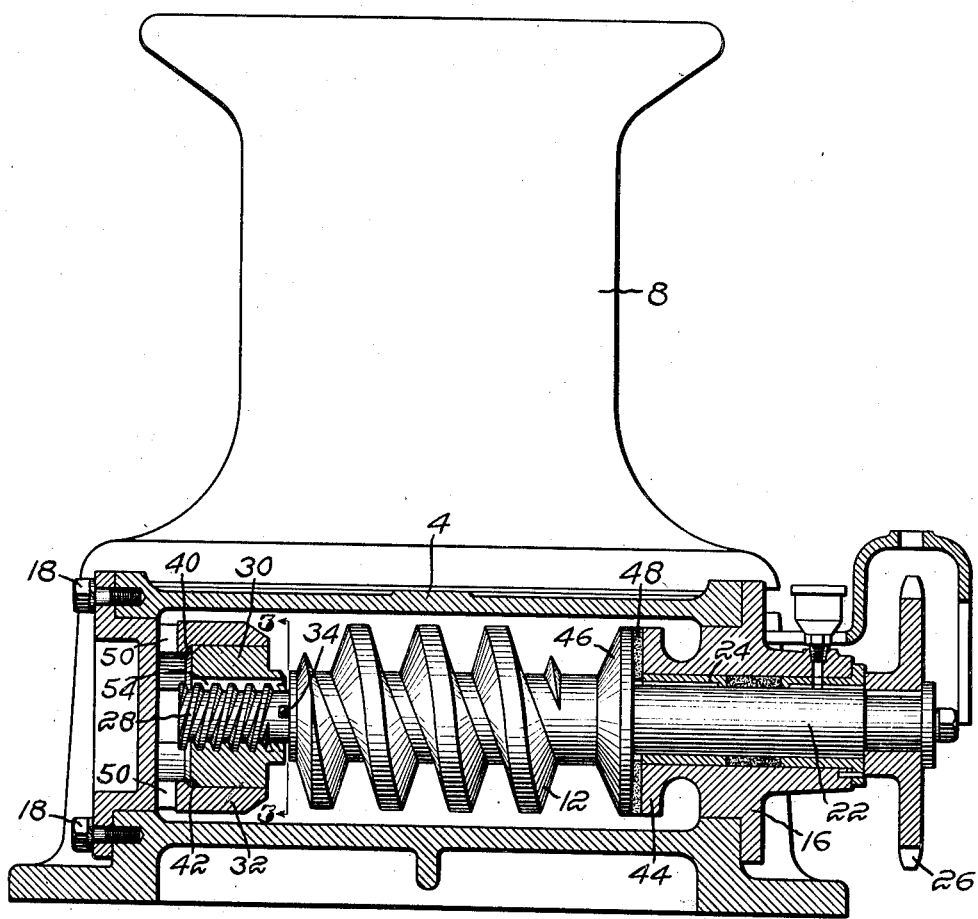
Fig. 2 is a sectional view on line 2—2 of Fig. 1.
Figure 3:
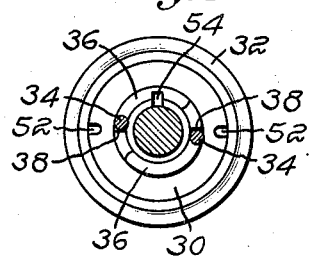
Fig. 3 is a detail sectional view on line 3—3 of Fig. 2.

When the worm rotates in the reverse direction, and the nut travels in an outward direction,—that is to say, toward the left in Fig. 2,—there is a relative extension of the worm and nut. This is utilized in cooperation with suitable abutments to furnish the desired braking effect. In the present example, I have provided the sleeve 32 with a conical surface 40, adapted to mate with a correspondingly shaped surface 42 carried by the nut, thereby to produce a wedging effect of these parts when the nut is moved in an outward direction under the influence of the screw. When, therefore, the nut brings up against this abutment, and can move no further in this direction, the tendency is to move the worm in the opposite direction, and this is counteracted by another abutment 44 conveniently formed on the plug 16 and cooperating with the flange or shoulder 46 conveniently formed on the worm-shaft. A suitable thrust-bearing or washer 48 is interposed between the abutment 44 and the flange 46 to receive the thrust developed by the endwise pressure of the worm thereagainst. It should now be evident that the described mechanism provides a powerful brake, which serves automatically to prevent reverse rotation of the worm under the influence of the worm gear when the application of power to the worm is discontinued.

The mechanism is intended to run in an oil bath contained in the casing. Oil is supplied to the braking surfaces through one or more oil passages 50, while helical grooves 52 provided in the periphery of the nut 30 distribute oil on the bearing surface of the latter with the surrounding sleeve 32. A longitudinal groove 54 in the interior of the nut distributes oil to the threads of the screw and nut.

Figure 4:
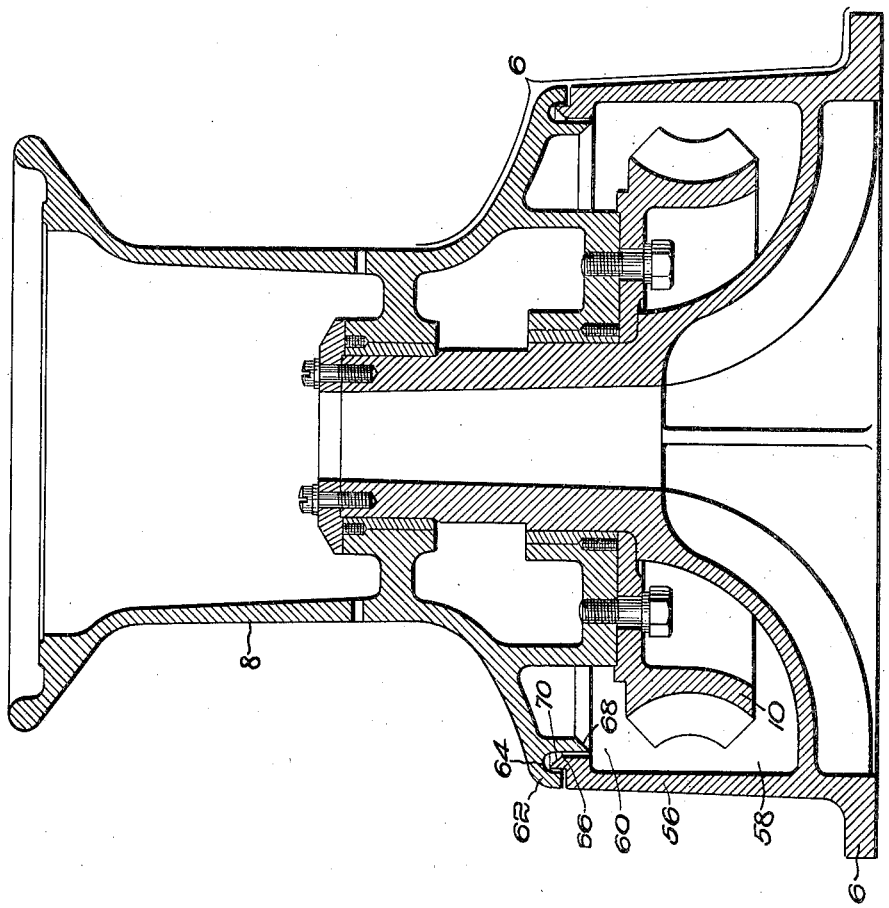
Fig. 4 is a sectional view on line 4—4 of Fig. 1.

The construction is such that the winch head and worm gear may be removed as a unit, without the necessity of detaching one from the other, this result being secured in the present example by providing the casing with a circumferential wall 56 encircling the worm-gear and providing within said wall an annular chamber 58, having an entrance 60 whose diameter is greater than that of the worm-gear. The chamber, however, is closed and the mechanism protected against the entrance of foreign matter by providing the spool with a part, herein a flange 62, at least as large in diameter as the entrance 60, and preferably overlapping the latter, as clearly shown in Fig. 4. This flange and the wall 56 have confronting surfaces opposed end to end, and they may be suitably constructed to exclude foreign matter and on the other hand to prevent the escape of oil, as by providing them with interjacent parts, herein an annular groove 64 formed in the flange and receiving an annular flange 66 formed on the wall.

It has been found in practice that the best results are secured by providing the depending part of the flange 62 with a bevel as at 68 and the upstanding part of the wall 56 with a similar but oppositely directed bevel as at 70. The first bevel tends to prevent the oil from creeping up into the joint, while the second forms an enlarged space or chamber which tends to break the adhesion of the oil and to allow it to gravitate back into the casing. The cooperative effect of the bevels is to eliminate all leakage of oil at the joint. It should now be evident that the described construction permits the parts to be easily and quickly dismounted without the necessity of detaching the worm-gear from the winch head, while at the same time affording proper protection for the driving mechanism.

Having thus described one embodiment of my invention for illustrative purposes, but without limiting myself thereto, what I claim and desire by Letters Patent to secure is:

1. In a brake mechanism, the combination of a pair of relatively rotatable and axially movable parts presenting cooperating brake surfaces brought into and out of engagement by relative axial movement, a rotatable member, and means including a screw and nut operated by rotation of said member in one direction to cause an axial thrust of one of said parts against the other and operated by rotation in the opposite direction to free said brake surfaces one from the other.

2. In a brake mechanism, the combination of two opposed abutments, two relatively rotatable and axially movable parts interposed between said abutments, and means connecting said parts to cause rotation of one part in one direction to be accompanied by an approach of said parts towards each other and to cause rotation of such part in the reverse direction to be accompanied by relative movement of said parts from each other and against said abutments, respectively.

3. In a brake mechanism, the combination of two opposed abutments, two relatively rotatable and axially movable parts interposed between said abutments, and means having cooperating helices connecting said parts to cause rotation of one part in one direction to be accompanied by an approach of said parts towards each other and to cause rotation of such part in the reverse direction to be accompanied by relative movement of said parts from each other and against said abutments, respectively.

4. In a brake mechanism, the combination of two opposed abutments, two relatively rotatable and axially movable parts interposed between said abutments, cooperating means carried by said parts, to limit relative axial approach as well as relative turning movement of said parts in one direction, and cooperating helices connecting said parts to cause rotation of one part in the first-mentioned direction to be accompanied by an approach of said parts towards each other and to cause relative rotation of such part in the reverse direction to be accompanied by relative movement of said parts from each other and against said abutments, respectively.

5. In a brake mechanism, the combination of two opposed abutments, a screw and a co-operating nut interposed between said abutments and limited thereby as to relative axial travel in unscrewing one from the other, means frictionally engaging said nut at a greater distance from its axis than the thread of said screw from said axis, and means carried by said screw for limiting the axial travel of said nut in the opposite direction.

6. In a brake mechanism, the combination of two opposed abutments, a screw and a co-operating nut interposed between said abutments and limited thereby as to relative axial travel in unscrewing one from the other, means frictionally engaging said nut at a greater distance from its axis than the distance of the thread of said screw from said axis, said nut and one of said abutments presenting cooperating tapered braking surfaces, and means carried by said screw for limiting the axial travel of said nut in the opposite direction.

7. In a brake mechanism, the combination of a pair of relatively rotatable and axially movable parts presenting cooperating brake surfaces brought into and out of engagement by relative axial movement, a rotatable member, and means coaxial with said member and said parts operated by rotation of said member in one direction to cause an axial thrust of one of said parts against the other, and operated by rotation in the opposite direction to free said brake surfaces one from the other.

8. In a machine of the class described, the combination of driving mechanism, brake mechanism automatically to resist rotation of said driving mechanism in one direction only, said brake mechanism including a screw and nut rotated by said driving mechanism for resisting rotation of said driving mechanism in one direction, and means providing for a supply of oil to the wearing surfaces of said brake mechanism.

9. In a machine of the class described, the combination of driving mechanism, brake mechanism for resisting rotation of said driving mechanism in one direction, said brake mechanism including a screw and nut, means presenting a frictional resistance to rotation of said nut, and means presenting a reservoir for an oil bath in which said driving mechanism and said brake mechanism run.

10. In a machine of the class described, the combination of driving mechanism, automatic brake mechanism including a part rotated by said driving mechanism for resisting rotation of said driving mechanism in one direction, and means presenting a driving connection between said part and said driving mechanism and providing for a limited relative rotation therebetween.

11. In a machine of the class described, the combination of driving mechanism, braking mechanism having provision automatically to resist rotation of said driving mechanism in one direction only, and means intermediate said driving and braking mechanisms providing for a limited relative rotation therebetween.

In testimony whereof, I have signed my name to this specification.

ALMON E. NORRIS.